US008335696B2

(12) United States Patent
Brown

(10) Patent No.: US 8,335,696 B2
(45) Date of Patent: Dec. 18, 2012

(54) INDEXED COMPETITION HEALTH CARE NETWORK METHOD

(76) Inventor: David A. Brown, Asheville, NC (US)

( * ) Notice: Subject to any disclaimer, the term of this patent is extended or adjusted under 35 U.S.C. 154(b) by 384 days.

(21) Appl. No.: 12/552,458

(22) Filed: Sep. 2, 2009

(65) Prior Publication Data

US 2010/0057492 A1    Mar. 4, 2010

Related U.S. Application Data

(60) Provisional application No. 61/190,947, filed on Sep. 3, 2008.

(51) Int. Cl.
G06Q 10/00 (2006.01)
G06Q 50/00 (2006.01)
A61B 5/00 (2006.01)
G06F 19/00 (2006.01)

(52) U.S. Cl. ............................................... 705/2; 705/3
(58) Field of Classification Search .................... 705/2–3
See application file for complete search history.

(56) References Cited

U.S. PATENT DOCUMENTS

| 6,564,192 | B1 | 5/2003 | Kinney, Jr. et al. |
| 2003/0050846 | A1 | 3/2003 | Rodon |
| 2003/0154094 | A1 | 8/2003 | Bredemeier et al. |
| 2003/0154104 | A1* | 8/2003 | Koningsberg ................... 705/2 |
| 2003/0158924 | A1 | 8/2003 | DeLegge |
| 2004/0103002 | A1 | 5/2004 | Colley et al. |
| 2004/0158501 | A1 | 8/2004 | Zhang |
| 2005/0065821 | A1 | 3/2005 | Kalies, Jr. |
| 2006/0106670 | A1 | 5/2006 | Cai et al. |
| 2006/0136264 | A1* | 6/2006 | Eaton et al. ................... 705/2 |
| 2006/0149596 | A1 | 7/2006 | Surpin et al. |
| 2006/0212359 | A1 | 9/2006 | Hudgeon |
| 2006/0224503 | A1 | 10/2006 | Luo |
| 2006/0229910 | A1* | 10/2006 | Longman et al. ................... 705/2 |
| 2007/0078680 | A1 | 4/2007 | Wennberg |
| 2007/0185732 | A1 | 8/2007 | Hicks et al. |
| 2008/0010097 | A1 | 1/2008 | Williams et al. |

OTHER PUBLICATIONS

Kominski et al., The Use of Relative Value Scales for Provider Reimbursement in State Workers Compensation Programs, Aug. 1999, UCLA Center for Health Policy Research, p. i, ii and 1-25.*
IHealthBeat, Aetna Posts Physician Price, Performance Data Online, Aug. 2006.*

(Continued)

Primary Examiner — Robert Morgan
Assistant Examiner — Joy Chng
(74) Attorney, Agent, or Firm — The Van Winkle Law Firm; David M. Carter

(57) ABSTRACT

There is provided a method for producing a price competitive health care system. A website, which is hosted on a computer server, is created for establishing a health care network. Providers are solicited to join the health care network and a plurality of providers apply by sending applications, including credentials, to the website from the providers' computers via the internet. The credentials of the providers are examined. Those with appropriate credentials are approved. The approved providers send to the website a number equal to the percentage of a known index which the approved providers are willing to charge for their goods and/or services. The website is accessed by patients who may be interested in purchasing the services or the goods of one or more of the approved providers, which access is accomplished from the patients' computers via the internet.

17 Claims, 2 Drawing Sheets

OTHER PUBLICATIONS

Finkler et al., Cost Accounting for Health Care Organizations: Concepts and Applications, 1999, Aspen Publishers, Second Edition.*
www.ameriplan.com, Feb. 2007, Obtained from Internet Archive Wayback Machine (www.archive.org), Answers to Commonly Asked Questions page, providerinfo.asp, become_provider.asp, providers.asp.*
Abstract of Japanese Patent Publication No. 2006-244351; Sep. 14, 2006; Haruhiko.

* cited by examiner

US 8,335,696 B2

INDEXED COMPETITION HEALTH CARE NETWORK METHOD

This is a U.S. non-provisional application relating to and claiming the benefit of U.S. Provisional Patent Application Ser. No. 61/190,947, filed Sep. 3, 2008.

BACKGROUND OF THE INVENTION

As more and more employers adopt high deductible health care insurance coupled with employee funded health savings accounts (HSAs), patients are becoming more responsible for their health care costs. However, often patients are uncomfortable asking about price information from their health care provider, particularly from their physician, for fear it will damage their relationship.

In addition, patients often do not have the knowledge to understand appropriate pricing of individual procedures. Also, it is often difficult for the provider and the patient to know prospectively all of the procedures or drugs which will be required for a certain course of treatment since those procedures or drugs may be changed during the course of the treatment. Furthermore, if procedures are individually priced, a patient selecting a provider based on an initial need might face higher total costs as previously unanticipated services become necessary. For example, if Dr. #1 charges $1000 for an appendectomy and $5000 for a cholecystectomy and Dr. #2 charges $2000 for an appendectomy and $2000 for a cholecystectomy, a patient thinking he or she needed an appendectomy might choose Dr. #1 for a lower price. Finding out later that a cholecystectomy was also necessary would have made Dr. #2 a less expensive choice, but by then the relationship had already been established.

Regarding medications, patients are best served by obtaining medications from a single pharmacy so as to avoid conflicting medications. Frequent price changes on medications, with some being loss leaders and others having higher prices, make it difficult for patients to obtain consistently good value.

The insurance reimbursement system which is now in place has created adversarial relationships between providers such as physicians and hospitals and insurance companies. Often insurance companies have a take it or leave it approach regarding reimbursements, which decreases provider panel size and, therefore, patients' choice of provider.

For rural communities, there is a significant distribution problem with provider services, in particular, physician services. There is also a decreasing availability of hospital services in rural communities. This is primarily due to insurance company reimbursement pressures.

In addition, the current insurance reimbursement system does not significantly recognize quality and customer service.

SUMMARY OF THE INVENTION

In accordance with one form of this invention there is provided a method for providing a price competitive health care system. A website is established. The website is hosted on a computer server. The health care network includes providers and subscribers. Providers are solicited to join the health care network. The health care network receives applications from the providers to join the health care network by sending applications from the provider's computer via the internet. The health care network receives and examines the credentials of the providers. Certain providers are approved to join the health care network. The health care network receives pricing information from the approved providers who send the pricing information to the website in the form of a percentage of an index which the approved providers are willing to charge subscribers for their goods and/or services. The website is accessed by subscribers who may be interested in purchasing the goods and/or services of one or more of the approved providers, which access is accomplished via the internet.

In another form of this invention, there is provided a method for operating a price competitive health care system which includes a plurality of providers and a plurality of subscribers. A website is established which is hosted on a computer server. The website is accessible to the providers and to the subscribers via the internet. An index is selected which lists prices for health care related goods and/or services. Providers are enabled to post prices of their goods and/or services expressed as a percentage of the index. Access to the website is provided for the subscribers whereby the subscribers may purchase goods and/or services from one or more of the providers.

In yet another form of this invention there is provided a method for transacting a price competitive health care system for a plurality of providers and a plurality of subscribers comprising. A website is established which is hosted on a computer server. Price quotations are solicited for goods and/or services from the providers. The price quotations are posted on the website and are expressed as a single percentage of an index for all of the goods and/or services of a provider. Subscribers are enabled to access the website via the internet whereby the subscribers may choose to purchase goods and/or services from one or more of the providers.

BRIEF DESCRIPTION OF THE DRAWINGS

The subject matter which is regarded as the invention is set forth in the independent claims. The invention, however, may be better understood in reference to the accompanying drawings in which:

DESCRIPTION OF THE PREFERRED EMBODIMENTS

This invention provides for a voluntary provider driven index based competitive health care network. These indexes, discussed below, show relative values of different products and services. Providers may include physicians, hospitals, pharmacies, drug wholesalers and retailers, and dentists. A website, called a Health Care Network website or HCN website is created which solicits providers to join the health care network. The website, which resides on a server, is accessible to subscribers or patients over the internet through the use of their personal computer. As used herein, the terms "patients" and "subscribers" are used interchangeably to mean individuals seeking the goods or services of health care providers.

Figure 1:
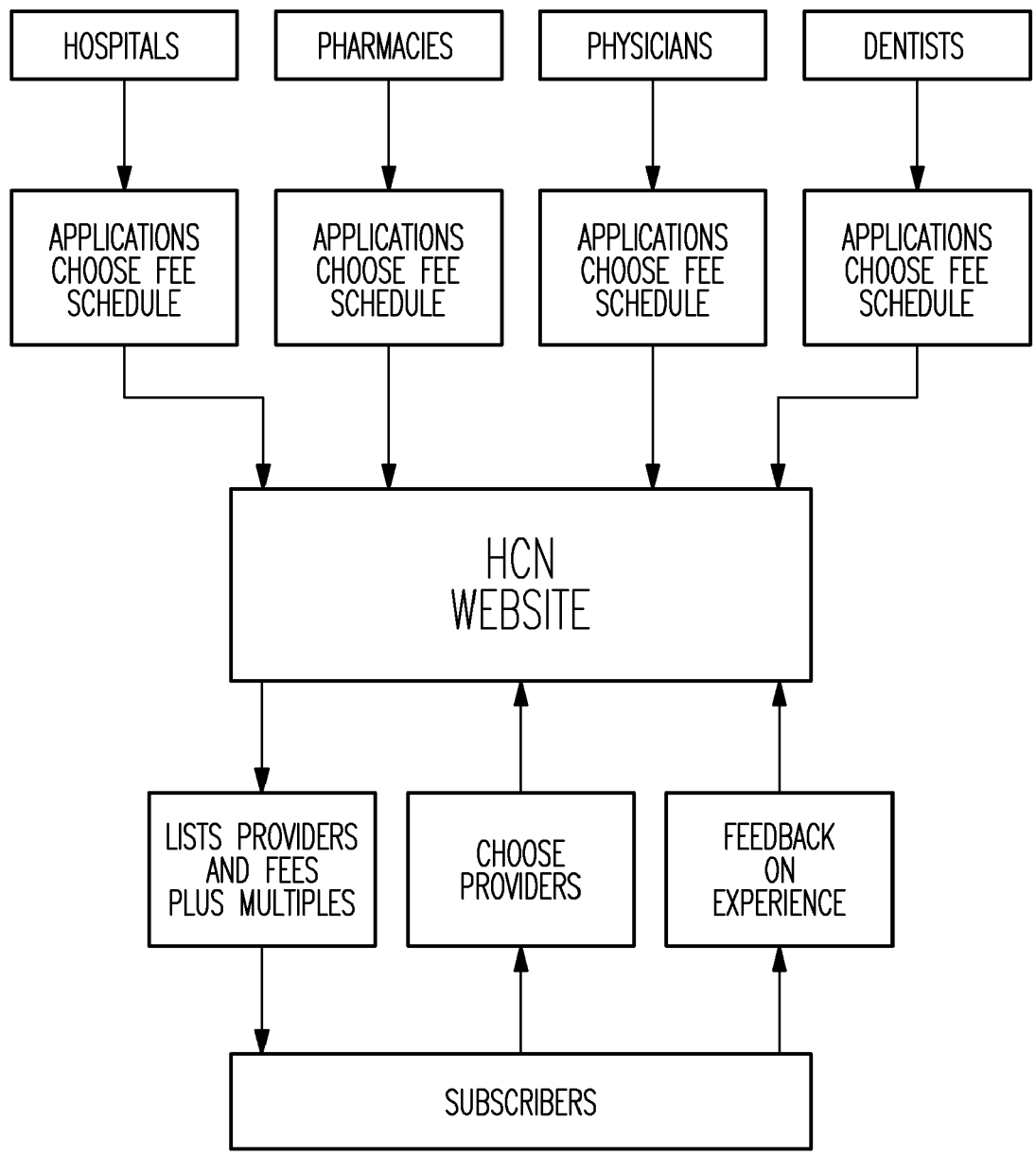
FIG. 1 is a block diagram illustrating features of the invention.

FIG. 1 is a diagram which illustrates certain relationships between the HCN website, the subscribers or patients, and the providers in accordance with one embodiment of the invention. Applications for providers to join the health care network are available to providers, such as hospitals, pharmacies, physicians and dentists, by filling out forms on the HCN website. Applicants are required to provide their credentials. The entity controlling the website determines whether or not the provider's credentials are sufficient to enable them to join the health care network. Alternatively, the entity controlling the HCN website might outsource the credentialing. Once the provider is approved to join HCN, that provider is listed on the HCN website.

Unlike an insurance company, HCN does not negotiate a fee structure with providers. At the time that an application is filed or after an application is approved, each provider must post its desired reimbursement or price for services and, in the case of pharmacies, for goods such as pharmaceuticals, as a percentage or multiple of an appropriate index, such as the Resource Board Relative Value Scale (RBRBS) which is used by Medicare for procedures and office visits.

Figure 2:
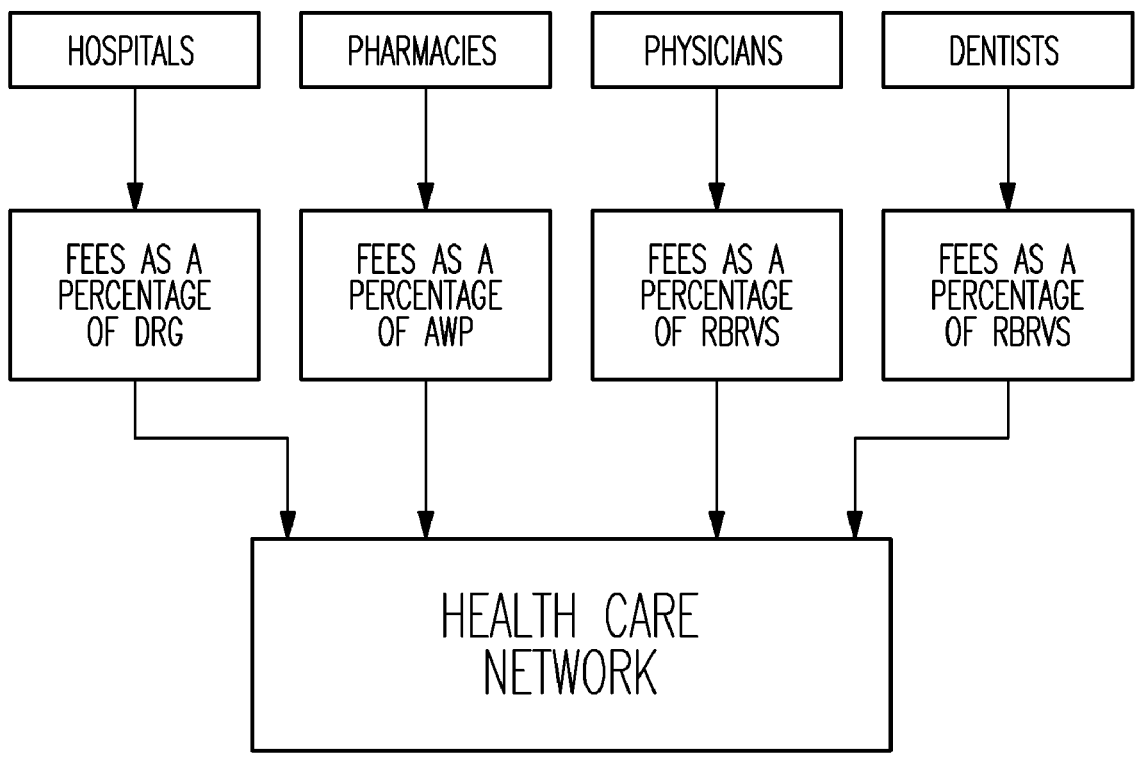
FIG. 2 is another block diagram illustrating features of the invention.

FIG. 2 is a diagram which illustrates the providers setting their fees as a percentage of an appropriate index. For example, a doctor located in a rural area might charge one hundred fifty percent (150%) of the RBRBS index because of a shortage of rural doctors while a doctor in a city where there is a lot of competition might charge eighty percent (80%) of the RBRBS index. In addition, a doctor who has an excellent reputation might charge one hundred fifty percent (150%) of the RBRBS index while a doctor who has just graduated from medical school might charge eighty percent (80%) of the index. A pharmacy would do the same except that it would use a different index such as the Average Wholesale Price (AWP) Index which is widely available. A hospital would also do the same except that it would probably use the Diagnosis Related Group (DRG) index.

Because of the large number of procedures and pharmaceuticals, the providers would not list specific prices, but only a percentage of an index. For example, if the RBRBS index states that the Medicare reimbursement for a physical examination by an internist is $400.00 and if an internist who has become a member of the health care network states that he or she is willing to charge eighty percent (80%) of the RBRBS for all of his or her services, then the price for the physical examination would be eighty percent (80%) of $400.00 which is $320.00. Thus, no matter what service is performed by that internist, the price will always be eighty percent (80%) of the RBRBS index. Subscribers then have one number they can use to assess the relative costs of goods and/or services for any HCN provider they might chose.

The percentage of the index chosen by the provider would remain in effect for a predetermined period of time, such as for example, one (1) year. The time period that the chosen percentage of the index is good for would be posted on the HCN website for that particular provider. After the year has lapsed, the provider might change the percentage, which again would be good for another year. The change might be made using a blinded process.

Preferably, the percentage of the index chosen by the provider is the maximum percentage. Thus, the provider may discount from that percentage of the index, but the provider's prices may not exceed the percentage of the index stated on the HCN website.

Preferably, each provider's credentials would be posted on the HCN website.

Subscribers may compare services from providers through the HCN website and then purchase services directly from the providers using the chosen percentage of the index published on the HCN website as a template for determining the price for such services.

It is also preferred that subscriber satisfaction surveys be posted on the HCN website to be filled out by subscribers. The HCN website would then post the survey results. In addition, subscribers may post feedback regarding their provider experiences on the HCN website.

When HCN is paired to high deductible health plans such as HSAs or Health Reimbursement Accounts (HRAs), each HCN subscriber has incentive to control costs. Providers are aware that subscribers have incentive to control costs and that their fees will be public knowledge and easily compared. Therefore, providers have incentive to choose and publish the lowest percentage of index acceptable to them, understanding that their competitors will be vying for business and that subscribers with incentive to save will have an easy means of comparing fees.

Use of HCN should result in lower costs for health care. Providers will be in competition with each other, thus have reason to select lower fees. The more desirable the area, the more competition will exist, thus the lower fees become, until some providers relocate to underserved areas. Currently, providers negotiate with networks and have incentive to bargain for the highest reimbursement possible. Using the HCN, network development becomes much less expensive. Instead of negotiating agreements provider by provider, the process becomes automated, with each eligible provider responsible for selecting its own percentage and living with the business consequences.

Costs will be pressured down not only locally, but also regionally and nationally, depending on product or service. For example, subscribers will have incentive to compare fees in nearby, or even distant locations, for elective, bigger-ticket procedures (e.g., knee replacement). Subscribers could easily compare drug prices (% AWP) nationally, pressuring pharmacies' fee selection downward.

As all drugs would be priced as a percentage of AWP, it is easier for providers and patients to understand and remember the relative cost of drugs used to treat the same condition. Thus, more rational decisions can be made as to choice of specific medication for a condition (e.g., brand vs. generic). Wholesalers, therefore, have incentive to price drugs more realistically with respect to added value. For example, with transparency, a doctor will want to prescribe and a patient will want to purchase a drug that is expected to perform five percent (5%) better for five percent (5%) more money, as opposed to the current situation, where a drug that may perform five percent (5%) better costs five (5) times as much.

A patient's expense would be related not only to the percentage of index charged, but also to the number and intensity of services performed. A natural outgrowth of this would be comparative data among providers, so that patients can judge by that provider's record what the whole experience is likely to look like.

Use of HCN should result in improved quality of health care. Providers will want to command as high a percentage of index as possible (more money), but will have to justify it in a competitive, transparent environment. Providers will have incentive to improve outcomes and demonstrate the improvement so that subscribers will select them at a higher percentage of index. With providers finally having financial incentive to improve and demonstrate outcomes, there will be considerable growth in outcomes research and measurement.

Providers will now have incentive to invest in technology such as electronic medical records, as they will facilitate improved outcomes which can then be advertised as a justification for charging a higher percentage of index.

Subscribers who use HCN should have a better experience. Now providers are free to select higher percentage of index, but will need to prove they are worth it to attract and retain business. Providers thus have incentive to invest in improving patient satisfaction and demonstrating that. As with clinical outcomes, there should be increased development of more sophisticated, objective measurements of patients' satisfaction with the experience with providers in response to the providers' desire to demonstrate this as a competitive advantage and the patients' desire to have access to this as a selection criterion.

All credentialed providers are able to participate, and have no reason not to, as they choose their own percentage of index. Therefore, the panel of providers should be extensive. As providers will want to command higher percentage of index, they will have incentive to locate in areas with less competition. Thus, our current provider distribution problem will be alleviated. With transparency and competition, providers will be able to identify and select areas of provider shortage and command a higher percentage in that area. Subsequently, other providers will be able to see the higher percentages commanded in a location and may also choose to provide services in that area, creating competition and pressuring fees downward there, too. Patients will have access to a broad, nationwide network, thus seamlessly access network provider despite travel or relocation. In the event of provider shortage in their community, they will have ready access to fee information and availability of other network providers. If particular specialties have global shortages, that will likely be reflected in higher percent of index being selected by those providers. If that is the case, those specialties' training programs could be targeted for expansion, thus alleviating the shortage and creating competition, with the end result being the percent of index being selected by that specialty being closer to the norm for other specialties. If a particular specialty typically chooses a higher percent of index, it could be that there is not necessarily a shortage, but that the appropriateness of the index to that particular specialty needs to be reassessed. Thus, significant variation in a specialty's percent of index chosen as compared with other specialties could serve as a signal to review the index. Also, as practice patterns change within a specialty, there will be an effect on physician income if percent of index remains the same. Therefore, as these changes take place, there will be changes in the percent of index chosen by those specialists either in response to competition, if more efficient procedure performance allows it, or by the desire to maintain income, in the event of significant drop in procedural efficiency. As a specialty as a group drifts substantially higher or lower than the percent of index chosen by physicians as a whole, there is a signal to review the appropriateness of the index to that specialty again.

This can be accomplished by comparing the percent of index chosen by a specialty as a group with the reported incomes of those physicians. If a specialty's average percent of index is high, but average income is low, the underlying index needs to be corrected. If the percent of index is low but incomes are maintained, again, the index should be reviewed. If the percent of index is high and the average income is high, then there is likely a shortage within that specialty leading to less competition, which should be addressed at the training program level.

All qualified providers are welcome to participate. As they are free to choose their own percentage, all should choose to participate. Thus, patients can choose from a broad panel, understanding the financial consequences of choosing a more expensive provider.

While government mandated universal coverage is not a requirement for HCN to operate effectively and efficiently, the HCN works well as a vehicle by which universal coverage can be achieved. To have as much money available for universal coverage as possible, every patient and every provider should have an incentive to control costs and improve outcomes, which HCN does.

Health savings account contributions are currently tax deductible, with limits. As a further incentive to drive costs downward, the government might set a maximum percent of index that can be debited from an HSA for a service. For example, if the maximum allowed by law to be debited from an HAS is one hundred twenty percent (120%) of index, and the provider charges one hundred thirty percent (130%), the remaining ten percent (10%) is charged directly to the patient. This would encourage providers to set their fees at or below the amount for which HSAs could be utilized, but would not mandate that they do so.

With above cost savings measures and competition in place, the system will run more efficiently. The government could then decide to subsidize premiums below certain income levels, and even contribute to patients' HSAs below even lower income levels. The government could review the providers' percentages of index chosen in any area and cover services for subsidized patients only at providers at or below a certain percent of index. This allows coverage for everyone and provides incentive for providers to choose lower percent of index. This percent could vary by area, depending on providers availability in that area. This also eliminates the cost shifting that currently occurs between government and non-government payors.

Use of HCN should result in subscribers engaging in more healthy behavior. The plan design provides financial incentive for healthy behavior, as the system promotes improved quality and decreased cost, and the rewards go to the individual. A criticism has been that patients might forgo appropriate care to save money. This can easily be corrected by allowing the tax deductibility of premiums/HSA contributions or, in the case of patients below certain income levels, subsidies, only when certain care has been demonstrated (e.g., one primary care preventive visit with certain screening). As this network and accompanying plan designs grow, patients will end up with larger and larger HSAs. These will make possible even higher deductibles, thus lower premiums, and, with patients wanting to save, further pressure providers to choose a lower percent of index.

The above method would create price competition for health services. The subscriber or patient can review the index percentage online for providers prior to seeking the goods or services. The patient can then select a provider that he or she believes is appropriate. In addition, since a percentage or multiple of an index is used, pharmacies would no longer use loss leaders and then charge higher prices for other products. Thus, patients could then more rationally determine which provider to choose, taking cost and service into consideration. This method will cause hospitals to compete with one another since patients may be willing to travel some distance for non-emergency procedures if the price is lower.

It is anticipated that the entity controlling the website would charge a network access fee, paid at a specified interval by the subscriber, subscriber's employer, or insurer depending on the underlying plan configuration. For example, the fee may be $5.00 per subscriber per month.

The web based voluntary nature of provider fee setting makes network development much more efficient, as the individual negotiation step is no longer necessary. Also, the providers' setting of fees per order allows them to differentiate by value and service and encourages them to invest in technology such as electronic records and other areas to improve the patients' outcomes and satisfaction.

Some of the advantages to the patient are set forth below.

It provides incentive for physicians and pharmacies to choose low multiples, hence have low prices, as patients will readily view the multiple and choose providers based on these. It provides a simple method of fee comparison, as opposed to trying to understand the relative value of each potential procedure.

All medications being linked to index such as AWP will result in more responsible drug development and pricing. Now, with patients and physicians unaware of a drug's true cost to an insurance plan and patient, a drug providing five percent (5%) additional benefit might be prescribed at five (5) times the cost. With patient and provider awareness of cost in indexed format, a five percent (5%) better medication is more likely to command a five percent (5%) higher price, so pharmaceutical companies will likely price new drugs accordingly. This will benefit patients by having prices more closely tied to the real value of a medication as compared with other choices and will encourage pharmaceutical companies to pursue true breakthrough drugs that could legitimately command a higher price.

Providers will compete for business in more "desirable" locations by lowering multiples; this will, in turn encourage providers to locate in underserved areas as they can command a higher multiple due to the lack of competition. This helps solve the current distribution problem. The patient can then choose to receive service closer to home, perhaps at a higher multiple, or weigh the inconvenience of traveling for care against the lower price available by doing so. The patients' willingness to travel will dictate the multiple differences between locations.

Doctors will have incentive to set multiples low enough to attract patients. They will also have reason to invest in improving outcomes, improving patient satisfaction, and investing in technology such as electronic medical records, as they could be potentially rewarded by being able to charge a higher multiple and still attract patients by the increased value provided.

Network development expense would be drastically reduced as the individual negotiations step is eliminated. Providers can sign up at whatever multiple they choose. The patients will reward appropriate choices by seeking services there. With easy comparison and patient awareness and involvement, providers with high multiples and no differentiating features will not have patients.

Insurance companies may use the network in a variety of ways including but not limited to the following: cover the patient to a certain multiple and then allow the patient to pay the rest as an individual; for example, if the plan covers to 1.3 x index and the patient wants to see a doctor who charges 1.7× index, the patient pays the remaining 0.4× index outside the plan; cover fully until the patient has paid the maximum out-of-pocket or other predetermined level, then require the provider to accept a certain maximum multiple (though this may require the plan to make contact with network members to have them agree); and create networks within networks (e.g., at one premium level could see providers in network with multiples of 1.1 or less, or for a higher premium see providers with a multiple of 1.3 or less, or for an even higher multiple see providers with multiples up to 1.5× index)

The HCN promotes price competition, distribution competition, outcomes competition, and satisfaction competition. It is done by the creation of an easy to understand system that provides subscribers the tools to shop for healthcare services intelligently and to be good stewards of their healthcare dollars.

While the invention has been described in terms of the above embodiments, those skilled in the art will recognize that the invention can be practiced with modification within the spirit and scope of the appended claim.

The invention claimed is:

1. A computer implemented method for providing a price competitive health care system comprising:
    establishing a website, hosted on a computer server, the computer server configured so as to establish the website for the health care network; the health care network having providers and subscribers;
    the website soliciting providers to join the health care network, providing on the website applications for providers to join the health care network;
    receiving completed applications from providers to join the health care network from the providers' computers via the internet;
    receiving and examining the credentials of the providers and approving certain providers to join the health care network;
    receiving pricing information from the approved providers through the approved providers' computers via the internet on the website in the form of a percentage of an index which the approved providers are willing to charge subscribers for their goods and/or services; the percentage of the index for a substantial number of the approved providers being less than or greater than one hundred percent (100%); the index being the Resource Board Relative Value Scale, the Diagnoses Related Group, or the Average Wholesale Price Index; listing the pricing information on the website; and
    enabling subscribers who may be interested in purchasing the goods and/or services of one or more of the approved providers to access the website from the subscribers' computers via the internet; the computer server being configured to enable the solicitations of providers, the receipt of the applications from providers, the listing of the pricing information on the website, and the access to the website by the subscribers.

2. A method as set forth in claim 1 wherein the index is a known index.

3. A method as set forth in claim 1, further including receiving a posting on the website from an approved provider listing all of the goods and services which the provider is willing to sell to the subscribers; the percentage of the index being the same for all of the goods and services that the approved provider posts on the website.

4. A method as set forth in claim 1 wherein the percentage of the index varies by geographic location.

5. A method as set forth in claim 1 wherein a substantial number of the subscribers are in a high deductible health insurance plan.

6. A computer implemented method for operating a price competitive health care system which includes a plurality of providers and a plurality of subscribers comprising:
    establishing a website hosted on a computer server; the website being accessible to the providers and to the subscribers through the providers and subscribers computers via the internet;
    selecting an index which lists prices for health care related goods and/or services; the index being the Resource Board Relative Value Scale, the Diagnoses Related Group, or the Average Wholesale Price Index;
    the computer server configured so as to permit providers through the providers' computers via the internet to post prices on the website of their goods and/or services expressed as a percentage of the index; the percentage of the index for a substantial number of the providers being less than or greater than one hundred percent (100%); and providing access to the website for the subscribers through the subscribers' computers via the internet whereby the subscribers may purchase goods and/or services from one or more of the providers.

7. A method as set forth in claim 6, further including enabling subscribers to receive applications to join the health care system.

8. A method as set forth in claim 6, further including requesting credentials from the providers; examining the credentials to determine whether or not a provider is approved to post information on the website; and listing approved providers on the website.

9. A method as set forth in claim 6 wherein the index is a known index.

10. A method as set forth in claim 6 wherein the prices posted by each provider being expressed as a single percentage of the index so that the subscriber may readily make price comparisons among the goods and/or services of the providers.

11. A method as set forth in claim 6, further including establishing different percentages of the index for different geographic locations of the providers.

12. A computer implemented method for transacting a price competitive health care system for a plurality of providers and a plurality of subscribers comprising:
  establishing a website hosted on a computer server; the computer server configured to enable the website to solicit price quotations for goods and/or services from the providers; the price quotations being posted on the website and being expressed as a single percentage of an index for the goods and/or services of a provider; the percentage of the index for a substantial number of the providers being less than or greater than one hundred percent (100%); the index being the Resource Board Relative Value Scale, the Diagnoses Related Group, or the Average Wholesale Price Index; and
  the computer server further configured to enable subscribers to access the website from the subscribers' computers via the internet whereby the subscribers may choose to purchase goods and/or services from one or more of the providers at prices based on the percentage of the index chosen by each provider.

13. A method as set forth in claim 12, further including maintaining the percentage of the index for a provider on the website for a predetermined time.

14. A method as set forth in claim 12, further including enabling each provider to view the indexes selected by all of the providers.

15. A method as set forth in claim 12, further including requesting credentials from the providers and examining the credentials.

16. A method as set forth in claim 12, further including enabling subscribers to post comments concerning the providers on the website.

17. A method as set forth in claim 12 wherein the index is a known index.

* * * * *

UNITED STATES PATENT AND TRADEMARK OFFICE
CERTIFICATE OF CORRECTION

| | | Page 1 of 1 |
|---|---|---|
| PATENT NO. | : 8,335,696 B2 | |
| APPLICATION NO. | : 12/552458 | |
| DATED | : December 18, 2012 | |
| INVENTOR(S) | : David A. Brown | |

It is certified that error appears in the above-identified patent and that said Letters Patent is hereby corrected as shown below:

In column 3, line 10, delete "Board" and replace it with "Based"

In column 8, line 25, delete "Board" and replace it with "Based"

In column 8, line 26, delete "Diagnoses" and replace it with "Diagnosis"

In column 8, line 59, delete "Board" and replace it with "Based" and delete "Diagnoses" and replace it with "Diagnosis"

In column 10, line 5, delete "Board" and replace it with "Based"

In column 10, line 6, delete "Diagnoses" and replace it with "Diagnosis"

Signed and Sealed this
Twelfth Day of February, 2013

Teresa Stanek Rea
*Acting Director of the United States Patent and Trademark Office*